March 19, 1929.  B. W. JONES  1,706,119
POWER SYSTEM
Filed Feb. 11, 1925
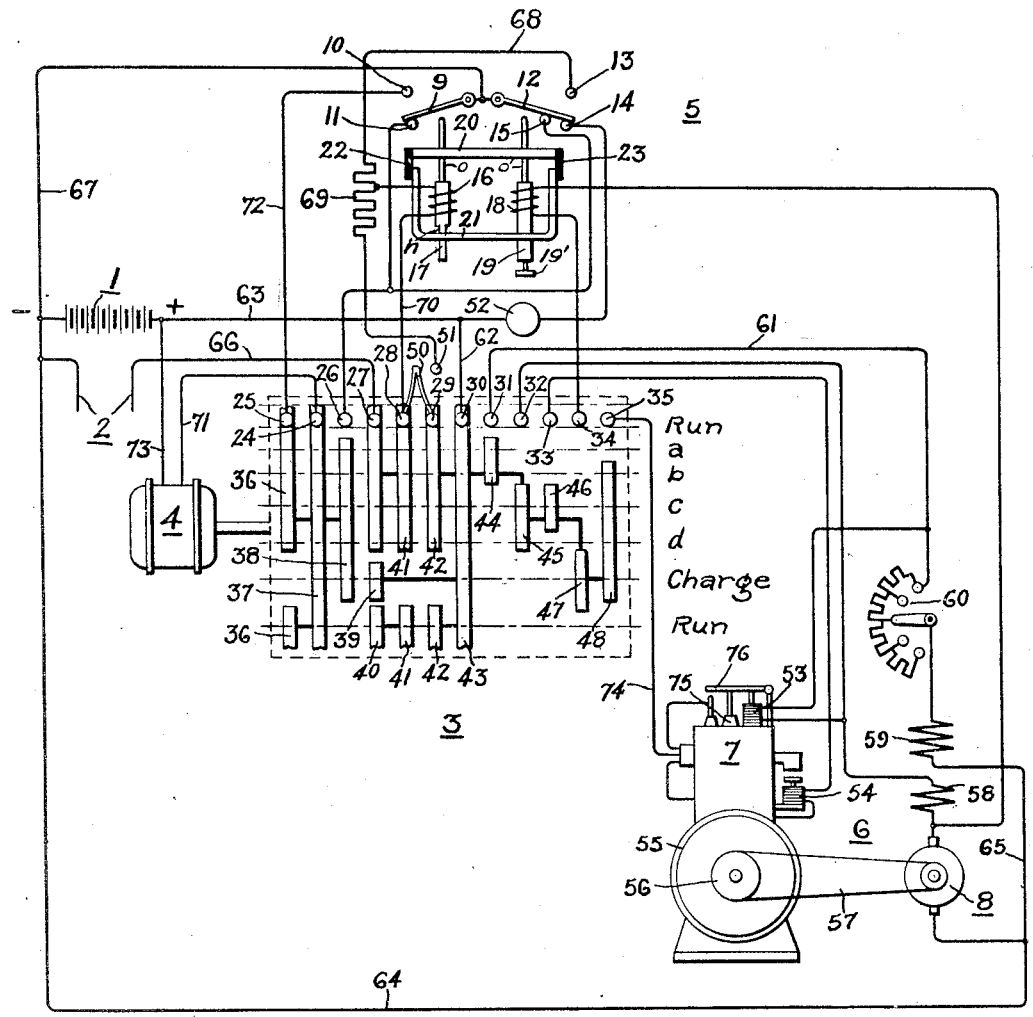
Inventor:
Benjamin W. Jones;
by *Alexander S. Lunt*
His Attorney.

UNITED STATES PATENT OFFICE.

BENJAMIN W. JONES, OF SCHENECTADY, NEW YORK, ASSIGNOR TO GENERAL ELECTRIC COMPANY, A CORPORATION OF NEW YORK.

POWER SYSTEM.

Application filed February 11, 1925. Serial No. 8,565.

My invention relates to power systems comprising a dynamo-electric machine arranged to be driven by a prime mover for the purpose of charging a storage battery, and has for its object the provision of an improved system for controlling the operation of the prime mover and dynamo-electric machine in accordance with the electrical conditions of the battery and for protecting the battery against injury under various abnormal conditions of operation.

It is well known that a storage battery can be maintained in good condition only when its rate and degree of charge are maintained within fixed limits. In order to produce this result, the control equipment should start the dynamo-electric machine when the battery voltage or the specific gravity of the battery electrolyte has decreased to one limit, should stop the dynamo-electric machine when the battery voltage or the specific gravity of the battery electrolyte has increased to the other limit, should permit adjustment of these limits, and should be designed to maintain these limits irrespective of temperature changes. It is also desirable that the period during which current is supplied from the battery to the dynamo-electric machine be definitely limited; that a signal be given when the limits of this period are exceeded; and that the battery be protected against an injuriously high rate of discharge when it is utilized to supply current independently of the dynamo-electric machine. In accordance with my invention, these results are accomplished by means comprising a drum switch, a pilot motor for operating the drum switch and a relay for controlling the operation of the pilot motor in accordance with the electrical conditions of the storage battery.

My invention will be better understood from the following description when considered in connection with the accompanying drawing and its scope will be pointed out in the appended claims.

In the drawing the single figure thereof shows diagrammatically a power system wherein my invention has been embodied.

The system comprises a storage battery 1 arranged to be interconnected with a load circuit 2 through a drum switch 3 mounted on the shaft of a pilot motor 4 which is operated by current supplied through a master relay 5. The relay 5 is arranged to cause the pilot motor 4 and a generating set 6, comprising a prime mover 7 and a dynamo-electric machine 8, to be controlled in accordance with the electrical conditions of the battery 1.

The relay 5 comprises a contact member 9 arranged to cooperate with contacts 10 and 11, a contact member 12 arranged to cooperate with contacts, 13, 14 and 15, a shunt coil 16 and core 17 for controlling the position of the contact member 9, a series coil 18 and a core 19 for controlling the position of the contact member 12, and magnetic members 20 and 21 for completing the magnetic circuit between the cores 17 and 19. Nonmagnetic members 22 and 23 are interposed between the magnetic members 20 and 21 for ensuring that the fluxes of coils 16 and 18 are transmitted through a magnetic circuit comprising the cores 17 and 18. It will be observed that the circuit of the shunt coil 16 is completed through the contact member 12 which is moved to its upper position by the core 19.

With the core 19 in its upper position, the operating characteristics of the shunt coil 16 and contact member 9 are similar to those of the devices disclosed by Letters Patent of Walter O. Lum, No. 1,339,466, May 11, 1920, and Letters Patent of Eugene R. Carichoff and Benjamin W. Jones, No. 1,445,994, February 20, 1923, which are assigned to the same assignee as the present application. As set forth in said Letters Patents, each device is provided with a winding which causes the contacts of the device to be disengaged when the current of the winding has increased to a predetermined value and causes these contacts to be brought into engagement when the current of the winding has decreased to a predetermined value. In a manner similar to the arrangement shown in the Carichoff et al. patent for maintaining the movable core in its various positions, the core 17 is maintained in its lower position when its flux is comparatively high, is moved to its upper position when its flux is lower, and is moved to its lower position when its flux has decreased to a still lower value.

This cycle of operation will be recognized as characteristic of the "lock-out" type of switches shown in the aforementioned United States Letters Patent to Lum, and Carichoff and Jones, and for purposes of illustration I have diagrammatically shown core 17 provided with a "closing" or "operating" air gap $o$ between the upper end of the core and the upper magnetic member 20 and a "holding" or "holding open" air gap $h$ between the lower enlarged portion of core 17 and the magnetic member 21. An operating coil 16 surrounds the core 17 and is arranged to be energized from the battery 1. An operating coil 18 is placed on the core 19 which is positioned to the right and substantially parallel to core 17 as viewed in the single figure of the drawing. Between the top magnetic member 20 and the enlarged portion of the core 19 I have provided an air gap $o'$. The lower portion of core 19 is provided with means for moving the core to its upper position when it is desirable to initiate operation of the relay.

When core 19 is moved to its upper position by any convenient means such, for example, as by pushing the core up by hand knob 19' a circuit is completed to energize operating coil 16 of core 17. Upon energization of coil 16 a flux begins to circulate through the magnetic circuit comprising the top magnetic member 20, core 19, the lower magnetic member 21, and back through the core 16. The pull resulting from the magnetic field in the appreciably shortened air gap $o'$ maintains 19 in its upper position. If the energization of coil 16 is above a predetermined limit, such, for example, as 30 volts for a 16 cell installation of the lead type of storage battery, the lower end of core 17 becomes magnetically saturated and a flux will be forced across the "holding" gap $h$ to cause a pull to be set up on the core 17 which opposes the pull in the gap $o$. This opposing pull along with the weight of the core is sufficient to hold the core down in its illustrated position. When the energization of coil 16 decreases below the predetermined value and is within predetermined limits, as for example, between 15 to 30 volts, the lower portion of core 17 becomes less nearly saturated and practically no flux is forced across the gap $h$. Under these conditions the pull across the "closing" gap $o$ becomes sufficient to move core 17 to its upper position. When the energization of coil 16 decreases below the minimum limit of the predetermined limits, such for example as, 15 volts, the pull across the gap $o$ is not sufficient to balance the effect of gravity in the core and the core again moves to its lower or illustrated position. If, however, the coil 18 is energized when coil 16 is energized below the minimum value of the predetermined limits, or coil 16 is deenergized, core 19 is maintained in its upper position because of the flux furnished by coil 18. If both coils 16 and 18 are energized simultaneously by a current tending to cause the magnetic flux through both cores to add, both cores will be maintained in the upper position. On the other hand, if both coils are simultaneously energized by currents tending to set up opposing magnetic fluxes, as for example, when the current reverses in coil 18, both cores 17 and 19 move to their lower positions because the flux at the closing gap $o$ and $o'$ is not sufficient to maintain either core in its upper position against the effect of gravity.

The drum switch 3 comprises contact fingers 24 to 35 inclusive arranged to cooperate with contact segments 36 to 48 respectively which are rotatable through positions "Run", $a$, $b$, $c$, $d$, and "Charge", the "Run" position being shown as repeated for the purpose of facilitating an understanding of the arrangement of the contact fingers and contact segments. It will be observed that the contact segments 36, 37, and 38 are interconnected; and that the connections between the contact segments 41 and 42 is made through a thermostatic strip 50 which is arranged to cooperate with a contact finger 51 under certain abnormal conditions of operation. A device, shown as a bell 52, is provided for indicating failure of the prime mover to start when it is cranked by the dynamo-electric machine 8.

The prime mover, shown as an internal combustion engine 7, is provided with a coil 53 for short circuiting its ignition circuit and operating the valve 75 to open its compression chamber during starting, with a flywheel 55, and with a pulley 56 which is coupled to the pulley of the dynamo-electric machine 8 through a belt 57. The dynamo-electric machine 8 comprises a series field winding 58 and a shunt field winding 59 arranged to be connected to the battery 1 through resistor 60, conductor 61, contact finger 31, contact segments 44 and 43, contact finger 30, and conductors 62, 63, 64 and 65.

Assuming the drum switch 3 to be in its "Run" position as illustrated, the load circuit 2 is connected to the battery 1 through conductors 63 and 62, contact finger 30, contact segments 43 and 42, thermostatic strip 50, contact segments 41 and 40, contact finger 27 and conductor 66. With these connections, current will be supplied to the load circuit 2 from the battery 1 and, with the relay cores 17 and 19 in the positions illustrated, no change will be produced in the battery connections even though the battery voltage may vary between wide limits.

To initiate operation of the relay 5, its core 19 is moved manually to its upper position thereby connecting the shunt coil 16 to the battery 1 through conductor 67, contact member 12, conductor 68, the upper part of resistor 69, conductor 70, contact finger 28, contact segment 41, thermostatic strip 50, contact finger 29, contact segments 42 and 43, contact finger 30, and conductors 62 and 63. Under these conditions, current is supplied to the shunt coil 16 from the battery 1, flux is transmitted through a circuit comprising the cores 17 and 19 and yoke members 20 and 21, the core 19 is maintained in its upper position by this flux generated by coil 16 which causes a pull to be exerted at the gap $o'$ between the magnetic member 20 and the core 19, and, assuming the battery voltage to be above its lower limit, the core 17 is maintained in its lower position due to the predominance of the pull at the "holding out" gap $h$. When the battery voltage reaches its lower limit, however, the core 17 is moved to its upper position due to the predominance of the pull at the "closing" gap $o$ thereby moving the contact member 9 into engagement with the contact 10 and connecting the pilot motor 4 to the battery 1 through a circuit comprising conductor 71, contact finger 24, contact segments 37 and 36, contact finger 25, conductor 72, contact member 9, contact 10 and conductors 67 and 73.

Upon closure of the pilot motor circuit, this motor operates to rotate the drum switch 3 through its "Run", $a$, $b$, $c$, and $d$ positions into its "Charge" position where the pilot motor circuit is broken by disengagement of the contact finger 25 from the contact segment 36. In position $a$, the contact fingers 26 and 31 engage contact segments 38 and 44 respectively, the contact finger 26 and segment 38 closing no circuit for the reason that the relay contact members 9 and 12 are in their upper positions and the contact finger 31 and contact segment 44 completing a circuit from the plus side of the battery through the coil 53, the series field winding 58 and the armature winding of the dynamo-electric machine 8. It will be observed that the shunt field winding 59 and field rheostat 60 are connected in parallel with coil 53, field winding 58 and the armature winding of the dynamo-electric machine 8.

With these connections the dynamo-electric machine 8 is operated as a compound motor to crank the engine 7 and the coil 53 is energized to pull down the lever 76 by which the engine ignition circuit is short circuited and the valve 75 is operated to open the engine compression chamber, thus minimizing the torque required to accelerate the engine. In position $b$ of the drum switch 3, the engine ignition circuit is connected to the plus terminal of the battery through contact finger 35 and contact segment 48. In position $c$ of the drum switch 3, the contact finger 31 is disengaged from the segment 44, and the contact fingers 32 and 33 are caused to engage contact segments 45 and 46 respectively, thereby connecting the series field winding 58 and armature winding of the dynamo-electric machine 8 directly to the battery 1, deenergizing the coil 53 to an extent which permits opening of the spring operated valve 75 and opening of the short circuit across the engine ignition circuit, and energizing the choke coil 54 of the engine 7. Under these conditions, the engine should start. In position $d$ of the drum switch 3, the choke coil 54 of the engine is deenergized and the engine will drive the machine 8, as a generator. In the "Charge" position of the drum switch 3, the pilot motor 4 is deenergized by disengagement of the contact finger 25 from the contact segment 36, the load circuit 2 is connected to the battery 1 independently of the thermostatic strip 50 by disengagement of contact fingers 27, 28 and 29 from contact segments 40, 41 and 42 and by engagement of contact finger 27 with contact segment 39, and the dynamo-electric machine 8 is connected to the battery 1 in parallel with the load circuit 2 and in series with the relay series coil 18 by contact between finger 34 and segment 47.

Assuming the engine 7 to be operating properly, the dynamo-electric machine 8 will now be operated as a shunt generator to charge the battery 1, shunt field excitation being supplied through field coils 58 and 59 which are connected across the generator terminals in series with coil 53 and operation of the lever 76 to open the engine compression chamber and short circuit the engine ignition circuit being prevented by insufficient energization of the coil 53. In the "Charge" position cores 17 and 19 are maintained in the upper position due to the pull between magnetic member 20 and the respective cores and this pull is due to the flux furnished by coil 18 since coil 16 was deenergized and coil 18 was energized in the transition stage from position $d$ to the "Charge" position. As the charge of the battery 1 increases, the current transmitted through the series relay coil 18 decreases until the flux transmitted through cores 17 and 19 is insufficient to maintain the contact member 9 in its upper position although it is sufficient to maintain core 19 in its upper position because there is more flux at the gap $o'$ than at $o$ due to magnetic leakage. When this occurs, the battery is fully charged, the contact member 9 drops to its lower position, the pilot motor is energized through contact finger 26 and segment 38, and the drum switch 3 is moved into its "Run" position thereby deenergizing the engine ignition circuit and disconnecting the dynamo-electric machine 8 from the battery. In the "Run" position, however, the core 19 is still maintained in its upper position by flux supplied through the shunt relay coil 16 which is energized through contact segment 41 before coil 18 is deenergized when contact 34 separates from contact segment 47.

Should the engine 7 fail to start when cranked by the dynamo-electric machine 8, as previously explained, the flux transmitted through the magnetic circuit of the relay by the series relay coil 18, when the contact finger 34 engages the segment 47 in the transition stage from position $d$ to the "Charge" position of the drum switch 3, is opposed to that transmitted through this circuit by the shunt relay coil 16 and the contact members 9 and 12 drop to their lower positions thereby energizing the pilot motor 4 to operate the drum switch to stop at its "Run" position. When core 19 drops to its lower position it closes a circuit to ring the bell 52 which indicates that the engine has failed to function properly. When the trouble causing improper operation of the engine has been remedied core 19 is moved manually to its upper position in order that the relay can govern the starting and stopping operations. If the dynamo-electric machine, during the charging period, should cease to furnish current to the battery and the current flow tended to reverse the machine would be shut down even though coil 16 is not energized and the magnetic fluxes cannot act in opposition because the current passes through its zero value before it reverses through coil 18 and consequently coil 19 drops to its lower position effecting shut-down of the charging apparatus and operation of the alarm as previously outlined when the prime mover failed to start. During normal operation of the system, however, the core 19 is maintained in its upper position and the battery is automatically charged when its voltage has decreased to one limit and is automatically disconnected from the charging set when its charging current has decreased to a predetermined limit.

As previously indicated, an excessive current demand on the battery 1 for a predetermined time will cause the thermostatic element 50 to engage the contact finger 51. When this occurs, the lower part of the resistor 69 is connected in shunt to the shunt relay coil 16 thereby reducing the voltage impressed on this coil and tending to cause the charging set to be connected to the load circuit in parallel with the battery for the purpose of relieving the battery of some of its load.

The embodiments of the invention illustrated and described herein have been selected for the purpose of clearly setting forth the principles involved. It will be apparent, however, that the invention is susceptible of being modified in many ways to meet the different conditions encountered in its use and I therefore aim to cover by the appended claims all modifications within the true spirit and scope of my invention.

What I claim as new and desire to secure by Letters Patent of the United States, is:

1. The combination of a storage battery, means for charging said battery, a load circuit, a control device for connecting said battery to said load circuit either independently of or in parallel with said charging means, means comprising a relay having shunt and series coils wound upon a common magnetic core for regulating said device automatically to connect said charging means to said load circuit when the battery voltage has decreased to a predetermined limit and automatically to disconnect said charging means from said load circuit when the battery charging rate has decreased to a predetermined limit, and means associated with said control device for modifying the excitation of said shunt coil to accelerate the connection of said charging means to said load circuit when said battery has been overloaded for a predetermined interval.

2. The combination of a storage battery, means for charging said battery, a load circuit, a control device for connecting said battery to said load circuit either independently of or in parallel with said charging means, means comprising a relay having shunt and series coils wound upon a common magnetic core for regulating said device automatically to connect said charging means to said load circuit when the battery voltage has decreased to a predetermined limit and automatically to disconnect said charging means from said load circuit when the battery charging rate has decreased to a predetermined limit, and means comprising a resistor and a thermostatic element connected to be responsive to the current in said load circuit for connecting said resistor across said shunt winding to accelerate the connection of said charging means to said load circuit when said battery has been overloaded for a predetermined interval.

3. The combination of a storage battery, means comprising a prime mover and an electric machine arranged to be driven thereby for charging said battery, a control device comprising a switch and means for operating said switch to interconnect said battery and machine, and a relay comprising a magnetic core including a pair of movable parts, a shunt coil wound upon said core and connected to said battery when said machine is disconnected from said battery, a series coil wound upon said core and connected between said battery and machine when said machine is connected to said battery, a contact member operable in response to movement of one of said parts for controlling said switch operating means to initiate and control automatically the operation of said prime mover and electric machine and to connect said machine to said battery when the battery voltage has decreased to a predetermined limit and to disconnect said machine from said battery when the charging rate has decreased to a predetermined limit, and a second contact member operable to disconnect said machine from said battery when current is transmitted from said battery to said machine through said series coil.

In witness whereof, I have hereunto set my hand this 10th day of February, 1925.

BENJAMIN W. JONES.